March 11, 1958 — O. C. ECKEL — 2,826,261
ACOUSTICAL CONTROL APPARATUS
Filed Aug. 30, 1956 — 2 Sheets-Sheet 1
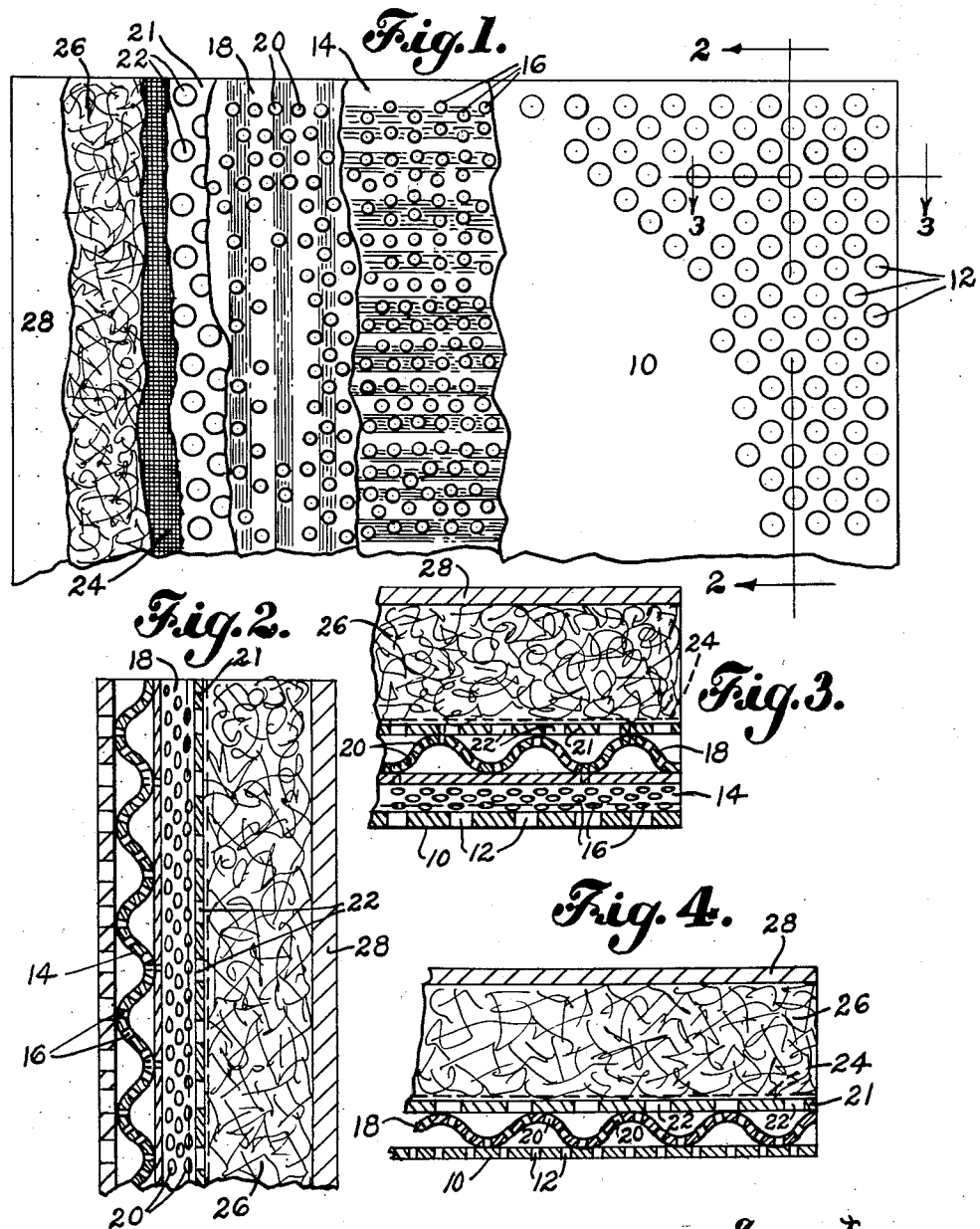

March 11, 1958  O. C. ECKEL  2,826,261
ACOUSTICAL CONTROL APPARATUS
Filed Aug. 30, 1956  2 Sheets-Sheet 2
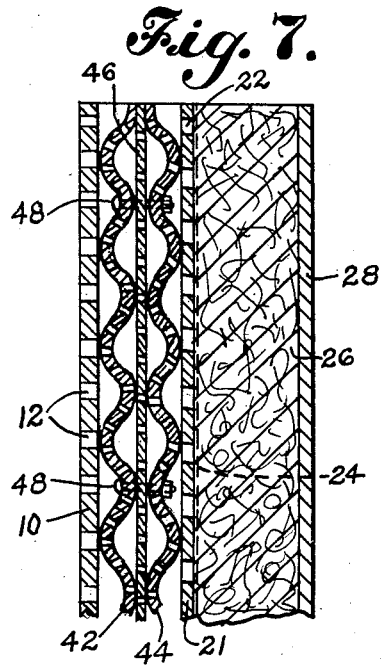
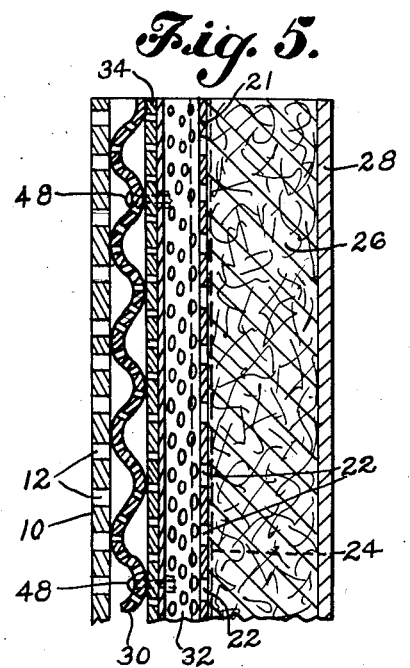
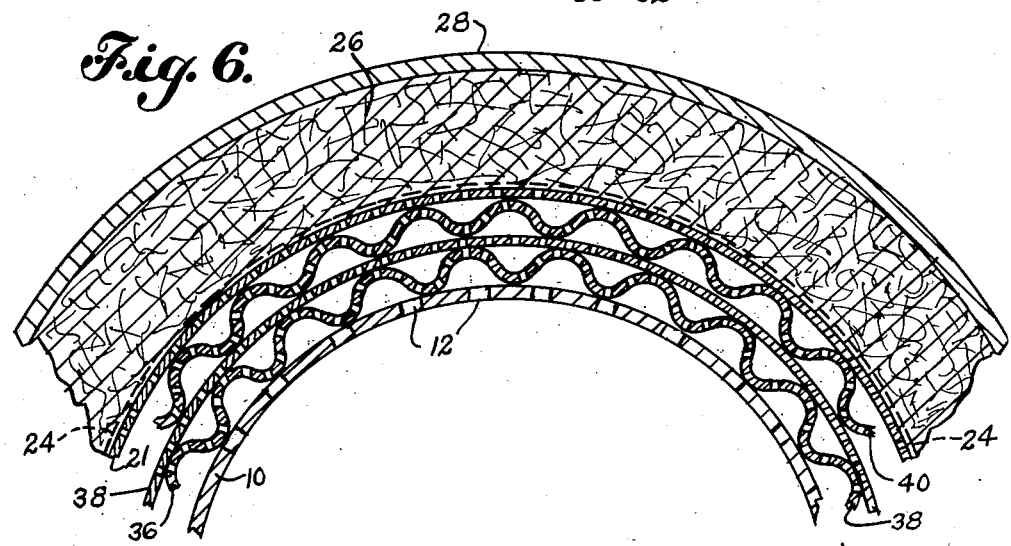
Inventor
Oliver C. Eckel
By Harold E. Cole
Attorney United States Patent Office 2,826,261
Patented Mar. 11, 1958

2,826,261

ACOUSTICAL CONTROL APPARATUS

Oliver C. Eckel, Carlisle, Mass.

Application August 30, 1956, Serial No. 607,051

9 Claims. (Cl. 181—42)

This invention relates to acoustical apparatus, especially intended to reduce the velocity of hot air or other gases prior to its reaching sound absorbing material.

Propulsion engines, such as well known jet engines, produce tremendous noise during their operation, and hot gases issue therefrom at high velocity. When such engines are operated in test cells, for instance, it is important to reduce the noise of said engines, so it is customary to provide panels containing mineral wool or other sound absorptive material. Hot gases moving at high velocity, such as 300 feet per second, or greater, for instance, have an erosive effect upon the sound absorbing material, causing disintegration thereof, since their temperature is often 600 degrees F., or higher. Because of this, it is my object to provide apparatus that will impede the flow of hot gases prior to their reaching said sound absorbing material, thus reducing the velocity substantially. Also in doing this said assembly will not interfere with the sound waves until the sound absorptive material is reached.

Another object is to impede the flow of gases by application of a corrugated structure and so perforated that the energy in the stream of gases is dissipated by said perforations.

A further object is to provide such apparatus of uniform structure and desirable rigidity, that is relatively compact, hence can include sound absorptive material to form a unitary panel for the walls, sides or other parts of a room, tunnel test cell or the like.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

Fig. 1 is a front elevational view of my acoustical control apparatus; broken away to show different parts uncovered.

Fig. 2 is a sectional view taken on the line 2—2 of Fig. 1.

Fig. 3 is a sectional view taken on the line 3—3 of Fig. 1.

Fig. 4 is a sectional view similar to Fig. 3 of a modified form of my apparatus.

Fig. 5 is a sectional view similar to Fig. 2 of another modified form of my apparatus.

Fig. 6 is a sectional view of a portion of my apparatus shown in the form of a curve.

Fig. 7 is a sectional view similar to Fig. 2 of another modified form of my apparatus.

As illustrated, my acoustical apparatus has an assembly to impede velocity which has, as shown, an outer supporting member 10 shown as a metal sheet having perforations 12 therein. This may be 14 gauge metal with holes 3/16" diameter which permit, with some impedance, the flow of air therethrough. Inwardly thereof, in position of use, is a corrugated panel 14 made of metal with perforations 16 therein that may be 1/16 inch in diameter, and, in any event, are preferably smaller than said perforations 12 and generally not in alinement therewith, thus changing the direction of the gases and materially impeding their flow. Since the velocity of the hot gases passing through said perforations 12 and 16 is very high, these members 10 and 14 are made of durable metal, such as 20 gauge galvanized steel, or other durable material. The perforated area of said corrugated member 14 should be from 25 to 40% of the total area, for good results, depending somewhat on the velocity of the gases.

As shown in Fig. 1, said impedance assembly may include a second corrugated panel 18 that has perforations 20 therein similar to perforations 16. These corrugations are shown with their ridges and grooves extending at a right angle to those of said panel 14. The perforations 12, 16 and 20 are generally out of alinement with each other to cause a more indirect flow of the hot gases, thus reducing their velocity.

Next to said corrugated member or members, is an intermediate, supporting member or sheet 21 having perforations 22 therein. Means to absorb sound waves are next to said supporting sheet 20, which may include a perforated retainer member 24, such as a screen or thin, perforated panel to aid in retaining sound absorptive material 26 such as mineral wool, for instance. This material is usually of greater thickness or depth than the thickness of said velocity impedance assembly, and since the velocity of the hot gases has been substantially reduced by said assembly, this sound absorptive material 26 remains serviceable for a long period, because the erosive effect of said gases has been greatly reduced.

At the rear of said material 26 is an inner or back supporting member 28, which may be a solid sheet, since it often lies against a wall, ceiling, floor or the like. However, if there is an air space at its rear, said member 28 may be perforated.

In said Fig. 5 I show my apparatus with two, perforated, corrugated panels 30 and 32, so arranged that the ridges and recesses thereof are in alinement. Between them is a perforated, flat sheet panel 34 in contact with the ridges of said corrugated panels 30 and 32, and which will prevent nesting of the latter and also impede said velocity. The assembly is otherwise the same as shown in said Figs. 1, 2 and 3.

In Fig. 6 I show my apparatus in the form of a curve with a perforated, corrugated panel 36 next to which is an intermediate, flat sheet panel 38, and next is another corrugated panel 40 the ridges and recesses of which are mostly out of alinement. The apparatus is otherwise the same as shown in Figs. 1, 2 and 3. This flat panel 38 permits accurate bending of the assembly, and also serves to reduce the velocity of the gases.

In Fig. 7 I show my apparatus with two perforated, corrugated panels 42 and 44 with their ridges in alinement, and with a flat sheet panel 46 between them. The apparatus is otherwise similar to that shown in said Figs. 1, 2 and 3

Various parts may be firmly held together as by rivets 48, as shown in Figs. 5 and 7 to hold the corrugated members together, including the intermediate, flat sheet. However, other holding means such as clamps or wire, for instance, would serve the purpose.

What I claim is:

1. Acoustical control apparatus comprising an assembly to impede the velocity of flowing gases, means to absorb sound waves from gases coming from said assembly said means being erosive under high temperature and high velocity of said gases, and supporting means for said first-mentioned means, said assembly embodying two adjacent corrugated metal members having perforations therethrough, the ridges of one extending angularly with respect to the ridges of the other, said sound wave absorbing means being inwardly beyond, and adjacent, said corrugated members and said supporting means.

2. Acoustical control apparatus comprising an assembly to impede the velocity of flowing gases, means to absorb sound waves from gases coming from said assembly said means being erosive under high temperature and high velocity of said gases, and supporting means for said first-mentioned means, said assembly embodying two adjacent corrugated metal members having perforations therethrough, the ridges of one extending parallel with the ridges of the other, said sound wave absorbing means being inwardly beyond, and adjacent, said corrugated members and said supporting means.

3. Acoustical control apparatus comprising an assembly to impede the velocity of flowing gases, means to absorb sound waves from gases coming from said assembly said means being erosive under high temperature and high velocity of said gases, and supporting means for said first-mentioned means, said assembly embodying two adjacent corrugated metal members having perforations therethrough, and a flat sheet between said corrugated members having perforations therethrough, said perforations of said corrugated members and flat sheet being positioned in non-alinement with each other, said sound wave absorbing means being inwardly beyond, and adjacent, said corrugated members and said supporting means.

4. Acoustical control apparatus comprising an assembly to impede the velocity of flowing gases embodying an outer supporting member having perforations therethrough, a plurality of corrugated metal members adjacent each other and said supporting member, and having perforations therethrough, material to absorb sound waves from gases coming from said assembly said material being erosive under high temperature and high velocity of said gases, a supporting member having perforations therethrough between and adjacent said material and said corrugated members, and a supporting member rearwardly of said material in position of use, said sound wave absorbing material being inwardly beyond and adjacent said corrugated members.

5. Acoustical control apparatus comprising an outside member having perforations therethrough, a corrugated metal member adjacent thereto having perforations therethrough, said perforations in said outside member and corrugated member occupying at least 25% of each of the area of said members, sound-wave absorbing material inwardly beyond, and adjacent said corrugated member said material being erosive under high temperature and high velocity of said gases, and perforated, supporting means for said sound-wave absorbing material, between the latter and said corrugated member.

6. Acoustical control apparatus comprising an outside member having perforations therethrough, a corrugated metal member adjacent thereto having perforations threthrough that are smaller in size and greater in number per given area than the first said perforations, sound-wave absorbing material inwardly beyond, and adjacent said corrugated member said material being erosive under high temperature and high velocity of said gases, and a supporting member having perforations therethrough between said corrugated member and material.

7. Acoustical control apparatus comprising an assembly to impede the velocity of flowing gases, comprising an outside member having perforations therethrough, a rigid, corrugated metal member adjacent said outside member having perforations therethrough, sound-wave absorbing material beyond and adjacent said corrugated member, and a supporting member, having perforations therethrough, between and adjacent said corrugated member and said absorbing material said material being erosive under high temperature and high velocity of said gases.

8. Acoustical control apparatus comprising an assembly to impede the velocity of flowing gases, comprising an outside member having perforations therethrough, a corrugated metal member adjacent said outside member having perforations extending diagonally therethrough, sound-wave absorbing material beyond and adjacent said corrugated member, and a supporting member, having perforations therethrough, between and adjacent said corrugated member and said absorbing material said material being erosive under high temperature and high velocity of said gases.

9. Acoustical control apparatus comprising an assembly to impede the velocity of flowing gases, embodying an outside supporting member having perforations therethrough, a corrugated, metal member inwardly of, and adjacent, said outside member having perforations therethrough, and flexible, sound-wave absorbing means inwardly beyond, and adjacent, said corrugated member, said absorbing means being erosive under high temperature and high velocity of said gases.

References Cited in the file of this patent

UNITED STATES PATENTS

| | | |
|---|---|---|
| 1,952,975 | Davy | Mar. 27, 1934 |
| 1,993,410 | Jacobson | Apr. 3, 1934 |
| 2,132,642 | Parsons | Oct. 11, 1938 |
| 2,148,496 | Park | Feb. 28, 1939 |
| 2,674,336 | Lemmerman | Apr. 6, 1954 |

FOREIGN PATENTS

| | | |
|---|---|---|
| 58,611 | France | Oct. 21, 1953 |